United States Patent
Jean et al.

(10) Patent No.: US 8,189,744 B2
(45) Date of Patent: May 29, 2012

(54) DYNAMIC HEARING/VOICE CARRY OVER FOR GLOBAL TEXT TELEPHONY

(75) Inventors: Oliver Jean, Antibes (FR); Paul Gounot, Antibes (FR); Iyadh Yahyaoui, Villeneuve-Loube (FR)

(73) Assignee: Texas Instruments Incorporated, Dallas, TX (US)

( * ) Notice: Subject to any disclaimer, the term of this patent is extended or adjusted under 35 U.S.C. 154(b) by 1216 days.

(21) Appl. No.: 11/755,807

(22) Filed: May 31, 2007

(65) Prior Publication Data

US 2008/0260113 A1 Oct. 23, 2008

(30) Foreign Application Priority Data

Apr. 19, 2007 (EP) ..................................... 07290483

(51) Int. Cl.
*H04M 11/00* (2006.01)
(52) U.S. Cl. ...................... 379/52; 379/90.01; 379/93.15
(58) Field of Classification Search ................... 379/52, 379/90.01, 93.15, 93.17
See application file for complete search history.

(56) References Cited

U.S. PATENT DOCUMENTS

| | | | |
|---|---|---|---|
| 2002/0097866 A1* | 7/2002 | Michaelis | 379/433.04 |
| 2003/0076817 A1* | 4/2003 | Han | 370/352 |
| 2005/0063520 A1* | 3/2005 | Michaelis | 379/52 |
| 2005/0277440 A1* | 12/2005 | Van Bosch et al. | 455/557 |
| 2007/0120968 A1* | 5/2007 | Krisbergh et al. | 348/14.09 |
| 2007/0127639 A1* | 6/2007 | Huang | 379/88.13 |
| 2007/0167200 A1* | 7/2007 | Wong et al. | 455/575.9 |

* cited by examiner

*Primary Examiner* — Melur Ramakrishnaiah
(74) *Attorney, Agent, or Firm* — Ronald O. Neerings; Wade James Brady, III; Frederick J. Telecky, Jr.

(57) ABSTRACT

A system and method for controlling a telecommunications device capable of text telephone, and voice carry over or hearing carry over operation where transition from text to voice operation, and vice versa, is accomplished without operator intervention. The system includes a text telephone signal detector that detects the presence of text telephone signals and an audio control manager coupled to the text telephone signal detector. The audio control manager comprises an audio stream manger that controls the processing of audio signals, and an audio profile manager that controls the routing of voice signals to the audio peripherals and the audio peripheral output sound loudness.

20 Claims, 3 Drawing Sheets

DYNAMIC HEARING/VOICE CARRY OVER FOR GLOBAL TEXT TELEPHONY

CROSS-REFERENCE TO RELATED APPLICATIONS

This application claims priority to EPO Patent Application No. 07290483.2, filed on Apr. 19, 2007, incorporated herein by reference.

BACKGROUND

Teletypewriters allow the hearing or speech impaired to make unassisted telephone calls over the voice grade telephone system. Communicating with teletypewriters through the voice telephone system is called text telephony ("TTY"). There are hundreds of thousands of TTY users in the United States and many more worldwide.

A Telecommunications Relay Service ("TRS") allows TTY users to communicate with voice telephone users. The TRS employs an operator called a Communication Assistant ("CA") who serves as an interface between the TTY user and the voice telephone user. The CA voices the TTY messages to the voice telephone user, and types the voice telephone user's spoken responses for the TTY user.

Voice carry over ("VCO") and hearing carry over ("HCO") are two additional services offered by the TRS. These services allow the user to combine voice and TTY communication as he deems desirable.

VCO allows a hearing impaired user to communicate using his own voice while receiving typed responses. The CA translates the voice telephone user's spoken responses into text for the VCO user, while the voice telephone user hears the VCO user's spoken voice.

HCO allows a speech impaired person to type his input, while hearing the speech of the voice telephone user. The CA voices the VCO user's typed messages for the voice telephone user, while the HCO user directly hears the voice telephone user's speech.

Many modern TTY devices allow VCO or HCO operation in addition to standard all text operation. Unfortunately, these devices burden the user by requiring the user to manually select the TTY device's mode of operation by, for example, inputting a particular key sequence or toggling a dedicated switch.

SUMMARY

Accordingly there are herein disclosed apparatus, methods, and systems for dynamically and autonomously switching between TTY and voice operation in telecommunications devices. Some embodiments provide a method for configuring a telecommunications device including detecting text telephone signals to be processed by the telecommunications device and configuring, without user interaction, the telecommunications device to process the text telephone signals.

Some embodiments provide a system for processing voice and text telephone signals within a telecommunications device including a text telephone signal detector, and coupled to the text telephone signal detector, an audio control manager. The text telephone signal detector detects text telephone signals to be processed by the telecommunications device. The audio control manger configures the telecommunications device for text telephone signal processing when text telephone signals are detected by the text telephone signal detector.

Some embodiments provide a telecommunications device including a text telephone signal detector, an audio control manager, a transceiver for transmitting and receiving signals on a telecommunications network. The text telephone signal detector detects text telephone signals. The audio control manager is configured to adapt the telecommunications device for text telephone signal processing when text telephone signals are detected by the text telephone signal detector.

Notation and Nomenclature

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct connection, or through an indirect connection via other components and connections. The term "system" refers to a collection of two or more hardware and/or software components, and may be used to refer to an electronic device or devices, or a subsystem thereof.

BRIEF DESCRIPTION OF THE DRAWINGS

In the following detailed description, reference will be made to the accompanying drawings, in which.

The drawings show illustrative embodiments that will be described in detail. However, the description and accompanying drawings are not intended to limit the claimed invention to the illustrative embodiments, but to the contrary, the intention is to disclose and protect all modifications, equivalents, and alternatives falling within the spirit and scope of the appended claims.

DETAILED DESCRIPTION

Disclosed herein are various systems and methods for controlling audio processing in a telecommunications device capable of TTY operation, and VCO operation or HCO operation. The disclosed systems and methods include:

A method for controlling audio processing in a telecommunications device capable of TTY operation, and VCO operation or HCO operation;

A system for controlling audio processing in a telecommunications device capable of TTY operation, and VCO operation or HCO operation; and Apparatus capable of transitioning from TTY operation to VCO operation or HCO operation with no user intervention.

Figure 1:
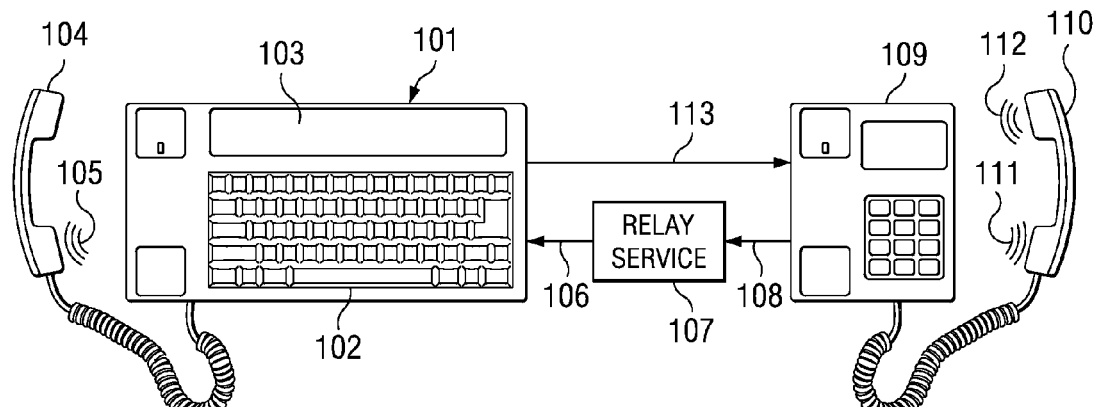
FIG. 1 shows an illustrative telecommunications system operating in voice carry over mode.

FIG. 1 shows an illustrative telecommunications system for implementing VCO operation. Text telephone 101 is enabled for VCO operation. For purposes of illustration, text telephone 101 is depicted as a table top model, adapted for use on the wired telephone network, also known as Plain Old Telephone Service ("POTS"). In other embodiments text telephone 101 may be a wireless handset operable for TTY and VCO or HCO operation. Text telephone 101 includes keyboard 102 for use in non-VCO modes of operation. In VCO mode, keyboard 102 is not used to converse with the user of voice telephone 109. To initiate a VCO call, the user of text telephone 101, places a call to Relay Service ("TRS") 107. TRS 107, in turn, calls voice telephone 109. With these connections in place, the user of text telephone 101 voices conversation 105 into handset 104. Voice transmission 113 is received by voice telephone 109 and converted into audible voice 112 by handset 110. The user of telephone 109 voices replies 111 into handset 110. Voice transmissions 108 from telephone 109 are intercepted by TRS 107. TRS 107 converts the speech received from telephone 109 into text, and transmits the text 106 to text telephone 101. Text transmission 106 is received by text telephone 101, output on text telephone display 103, and read by the text telephone user.

Operation in HCO mode is similar, but with the text telephone user typing input on keyboard 102 and hearing the voice telephone user's speech in handset 104 of text telephone 101. The CA at TRS 107 intercepts the text telephone user's typed input and voices the words for the user of voice telephone 109 to hear.

TRS 107 enables a VCO or HCO user to communicate with voice telephone users. However when both parties to a teleconversation employ VCO or HCO compatible telecommunications equipment TRS 107 may be omitted. The parties to the call may be directly connected through the telecommunications network, with each party employing voice or text communication as necessary.

With a conventional VCO or HCO enabled text telephone, the user employs the keyboard, or other manual control, to switch the text telephone from standard TTY operation to VCO or HCO operation. According to the present disclosure, text telephone 101 is operable for self-configuration for either voice or text operation without user intervention. When text telephone signals, for example Baudot, Cellular Text Telephone Modem ("CTM"), or other text representative signals received via a telecommunications network, attached keyboard, or other input device, are detected, the text telephone's audio processing circuitry is automatically configured for text reception; audio processing on the text channel may be disabled, and user audio is muted, (output volume reduced), to prevent the user from hearing the TTY tones. When not receiving text signals, the text telephone's audio processing circuitry is automatically configured for reception of voice signals (voice including any audio intended to be understood by the hearer); audio processing is enabled, user audio output volume is returned to a user preset level, and audio is routed to the appropriate interface, for example, the handset earpiece, speakerphone speaker, wired headset jack, or Bluetooth interface.

Text telephone signal detection is well known in the art and includes, for example, the text telephone signal detection methods described by ITU-T Recommendation V.18, entitled "Operational and internetworking requirements for DCEs operating in the text telephone mode" which is hereby incorporated by reference.

Figure 2:
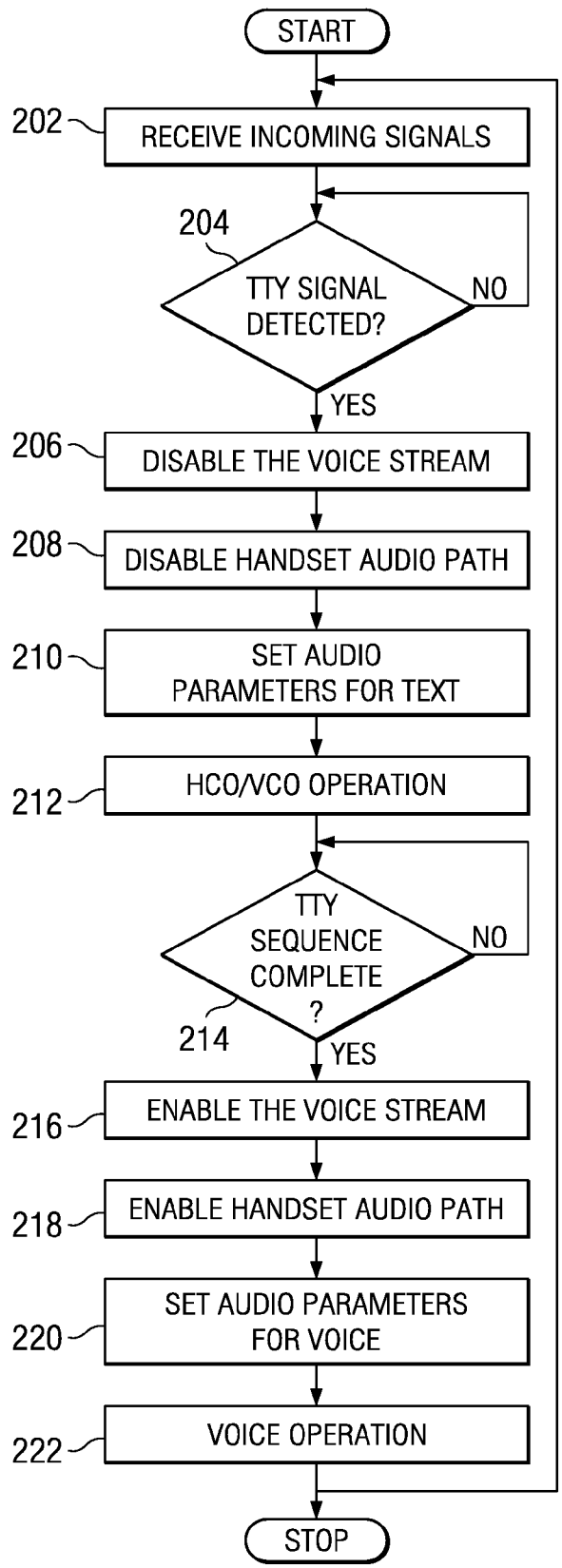
FIG. 2 shows a flow diagram for an illustrative TTY mode to voice mode control method.

FIG. 2 shows a flow diagram of a method for controlling text telephone audio processing to automatically (i.e. without user interaction) enable VCO or HCO operation. Text telephone 101 is connected to telephone 109, which may be either a voice or text telephone. The two telephones may be directly connected or connected through a TRS. Audio processing in text telephone 101 is configured for voice operation. In 202, text telephone 101 receives signals that are transmitted through the telephone network. In 204, text telephone 101 monitors the received signals to distinguish voice signals from TTY signals. If a TTY signal is detected, the voice stream is disabled (i.e. audio processing of the TTY signal is disabled) and TTY processing is enabled in 206. For example, digital signal processor modules or other circuits that process the audio channel are instructed to discontinue audio processing. In 208, the handset audio path is disabled; routing of audio signals within text telephone 101 is modified, preventing audio signals from driving the audio peripherals. The audio peripherals may include, for example, a handset speaker, a speakerphone speaker, a Bluetooth interface, or a headset jack. Audio parameters are set for text in 210, audio is muted as there is no audio signal to be reproduced. As indicated in 212, blocks 204-210 configure text telephone 101 for operation in TTY, VCO, or HCO mode, and the telephone continues to operate in TTY, VCO, or HCO mode while TTY signals are detected.

In 214, text telephone 101 continues processing TTY signals and monitors the received signal for completion of the TTY signal sequence, indicating a resumption of voice signals. When the end of the TTY sequence is detected at 214, for example by time-out from the last TTY signal detected, text telephone 101 discontinues TTY processing and reconfigures itself for voice processing. In 216, the voice stream is enabled, for example by instructing a digital signal processor ("DSP") or other circuits to resume audio processing. The appropriate voice audio path is reestablished in 218, routing audio to the proper peripheral. In 220, audio parameters are set for voice; audio volume is returned to a level appropriate for voice operation, for example, the level previously employed for voice operation. Text telephone 101 is now again configured for voice operation and remains so configured until a TTY signal is detected.

Although FIG. 2 depicts control of audio processing, routing, and volume in a particular sequence, this depiction is a matter of convenience only. No particular sequence is intended, and modification of audio parameters may occur in any sequence or concurrently. Further, in at least some embodiments, all of the actions depicted in FIG. 2 are performed without user interaction.

The above description of text telephone operation is directed to the perspective of signal received via the telephone network. However, a telecommunications device adapted to voice and TTY use, including VCO or HCO modes, comprises two audio channels, one detecting and processing text or audio input by the user, and the other detecting and processing text or audio received via the telephone network. These channels operate independently, and detection of text on one channel and the attendant configuration of that channel has no effect on the operation of the other channel. Each channel is dynamically and independently configured for voice or text processing without user intervention to enable VCO or HCO operation.

Figure 3:
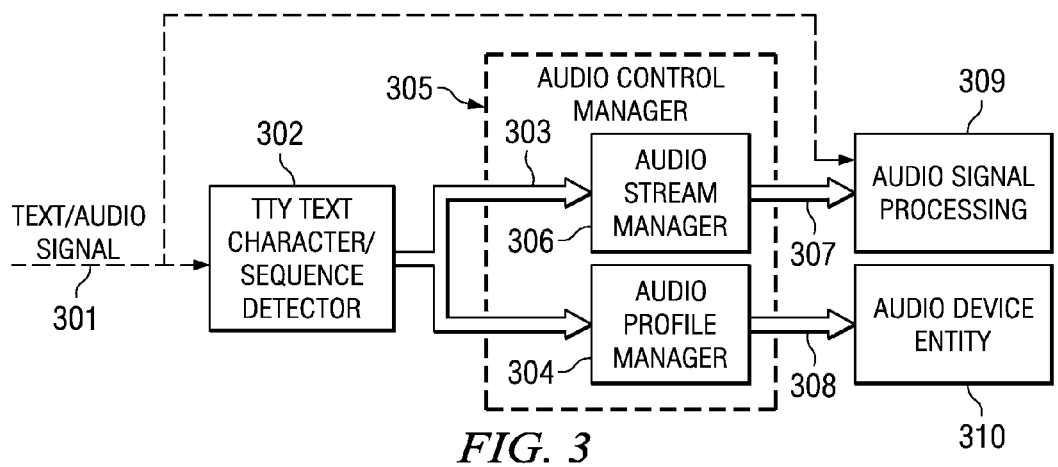
FIG. 3 shows a block diagram of an illustrative system for controlling transitions from TTY operation to voice operation.

FIG. 3 shows a block diagram of an illustrative system for controlling text and audio processing in a telecommunications device adapted for TTY, and VCO or HCO operation. Text/audio signal 301 is input to TTY detector 302 and to signal processor 309. TTY detector 302 monitors text/audio signal 301 to determine whether the signal is a TTY or other text signal, or an audio signal. TTY detector 302 outputs signal 303 to Audio Control Manager 305. Signal 303 indicates to Audio Control Manager 305 whether text or audio signals are being received, enabling Audio Control Manager 305 to configure the telecommunication device's audio systems to handle the signal appropriately. Audio Control Manager 305 comprises two sub-components, Audio Stream Manager 306, and Audio Profile Manager 304.

Audio Stream Manager 306 controls processing of text/audio signal 301 by audio signal processor 309. If signal 303 indicates to Audio Stream Manager 306 that text/audio signal 301 is a text signal, then Audio Stream Manager 306 outputs signal 307 instructing audio signal processor 309 to disable audio processing and to initiate text processing. When signal 303 indicates that the text sequence is complete, and that signal 301 comprises audio, Audio Stream Manager 305 outputs signal 307 instructing audio signal processor 309 to enable audio processing and to discontinue text processing.

Audio Profile Manager 304 controls the various audio device entities 310 included in a telecommunications device. Included in such control is routing of audio signal (not shown) from signal processor 309 to the selected audio entity 310, and selection of the audio output volume level for each audio entity 310. The audio device entities 310 encompass the telephone's various audio peripherals. Each included entity may require different signal routing and volume parameters. Examples of various audio entities include, but are not limited to, handset audio entity, speakerphone audio entity, headset audio entity, and Bluetooth audio entity. When signal 303 indicates to Audio Profile Manager 304 that text/audio signal 301 is a text signal, then Audio Profile Manager 304 outputs signal 308 disabling audio signal routing to the audio peripherals and muting audio. When signal 303 indicates that the text sequence is complete, and signal 301 comprises audio, Audio Profile Manager 304 outputs signal 308 routing audio to the appropriate audio peripheral, and increasing audio volume to a level suitable for that peripheral, for example, the volume level last applied to that peripheral or a default volume known to be safe.

Because a telecommunications device typically includes a pair of audio channels, a telecommunications device enabled to automatically and independently configure each channel for TTY or audio processing may employ a separate instance of the Audio Control Manager 305 for each channel. Alternatively, multiple channels may share a single instance of the Audio Control Manager 305. However implemented, input and output channels are autonomously and independently controlled to switch from TTY to voice operation without user interaction. For example, a TTY keyboard generating Baudot signals may be interfaced to a telephone incorporating the above described system through a microphone or headset connector on the telephone. The TTY signals generated by the keyboard are recognized by TTY detector 302, and consequently Audio Control Manager 305 initiates TTY processing and adjusts input volume to an optimum level for Baudot input. Simultaneously, an audio signal may be received via the telecommunications network and detected by TTY detector 302. Audio Control Manager 305 initiates audio processing on this channel, routes the audio to a selected audio peripheral, and adjusts output volume to an appropriate level. Thus, independent and autonomous TTY signal detection and audio channel control enables VCO or HCO operation without user configuration.

TTY detector 302 and Audio Control Manager 305 may be implemented in numerous forms, for example, programs executing on a DSP, microcontroller, or microprocessor, or as dedicated circuitry, either integrated or discrete.

Figure 4:
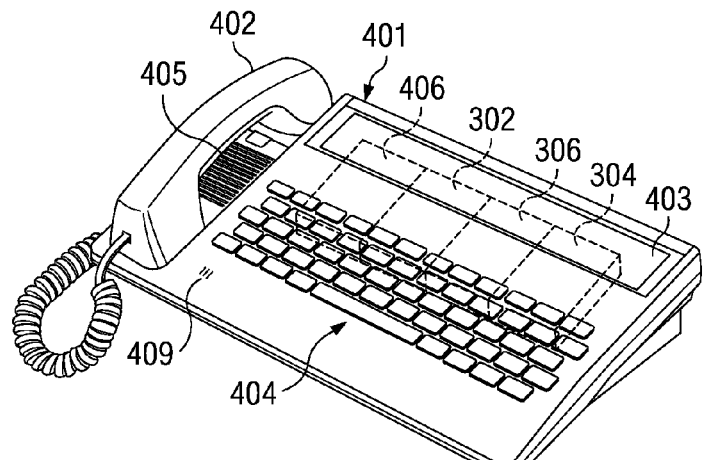
FIG. 4 shows an illustrative telecommunications device configured to allow transitions from TTY operation to voice operation without user intervention.

FIG. 4 shows an illustrative embodiment of a telecommunications device, a teletypewriter, 401 adapted to dynamically switch between TTY mode and VCO or HCO mode without operator intervention in accordance with the present disclosure. Teletypewriter 401 includes keyboard 404 for text entry in TTY or HCO modes, and display 403 for output of text in TTY or VCO modes. Handset 402 is applicable to both VCO and HCO modes, as are speaker 405 and microphone 409. Teletypewriter 401 comprises TTY detector 302 for detection of TTY and audio signals, Audio Stream Manager 306 to control processing of audio and TTY signals, and Audio Profile Manager 304 to control audio signal routing to audio peripherals and audio peripheral operational parameters, such as audio volume. Transceiver 406 is provided for transmitting and receiving signals on a wired or wireless telecommunications network.

Figure 5:
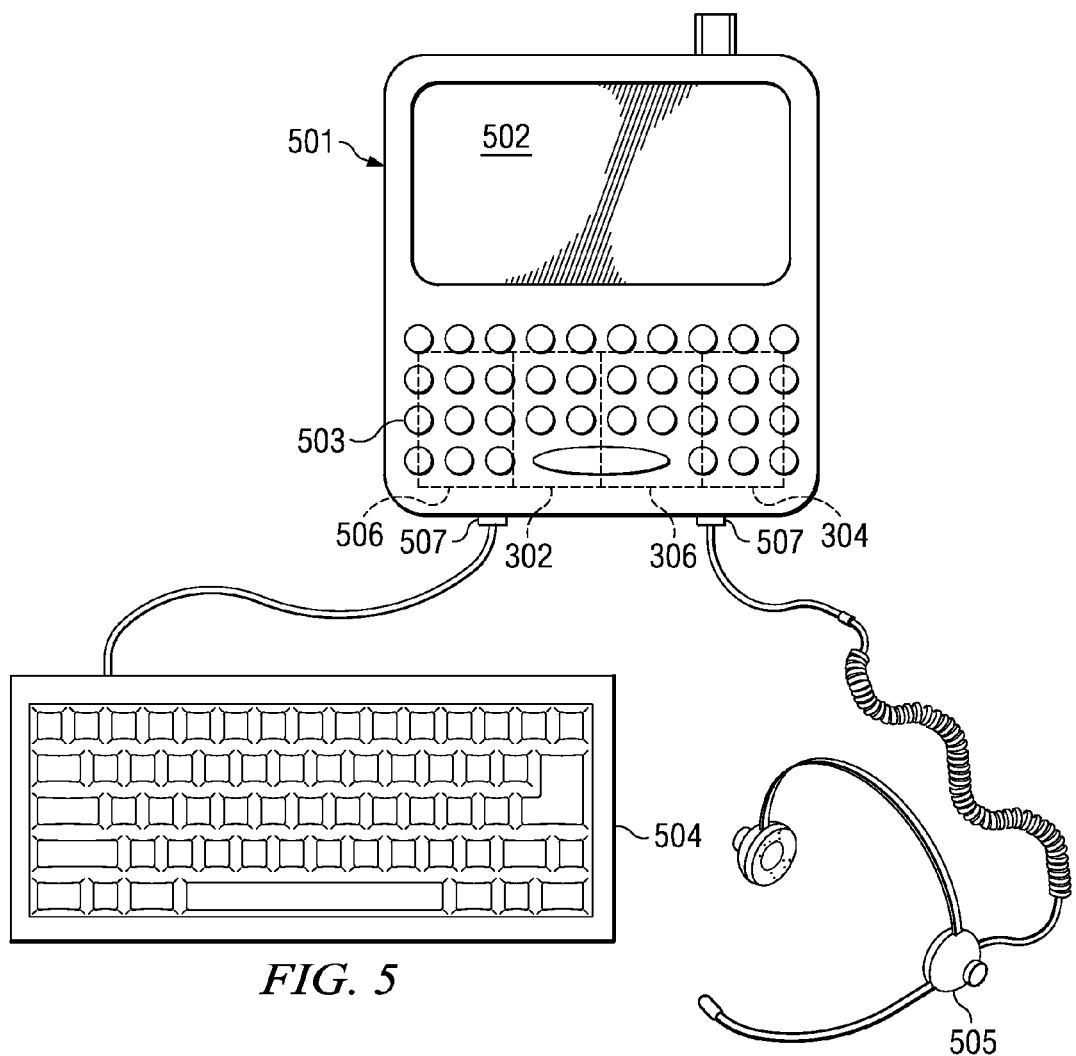
FIG. 5 shows an alternative illustrative telecommunications device configured to allow transitions from TTY operation to voice operation without user intervention.

FIG. 5 shows an embodiment of a wireless telecommunications device 501 adapted to dynamically switch between TTY mode, and VCO or HCO mode without operator intervention. Wireless telecommunications device 501 includes keyboard 503 for text entry in TTY or VCO modes, and display 502 for presentation of text in TTY or VCO modes. Other embodiments, for example, an embodiment implemented in a conventional cellular telephone may employ the cellular telephone keypad rather than the illustrated keyboard. Wireless telecommunications device 501 may also include a speaker and microphone (not shown) to facilitate HCO and VCO operation. Peripheral expansion ports 507 may be included to allow connection of external peripherals to facilitate TTY, and VCO or HCO operation. Keyboard 504 and headset 505 are illustrative examples. Although wired peripheral connections are illustrated, it is understood that peripherals may be connected by wireless means, for example, infrared or Bluetooth interfaces. Wireless telecommunications device 501 comprises TTY detector 302 for detection of TTY signals, coupled to both Audio Stream Manager 306 for control of audio and text signal processing, and Audio Profile Manager 304 for control of audio signal routing to audio peripherals and audio peripheral operational parameters, such as audio volume. Transceiver 506 is provided for transmitting and receiving signals on a wireless telecommunications network.

Figure 6:
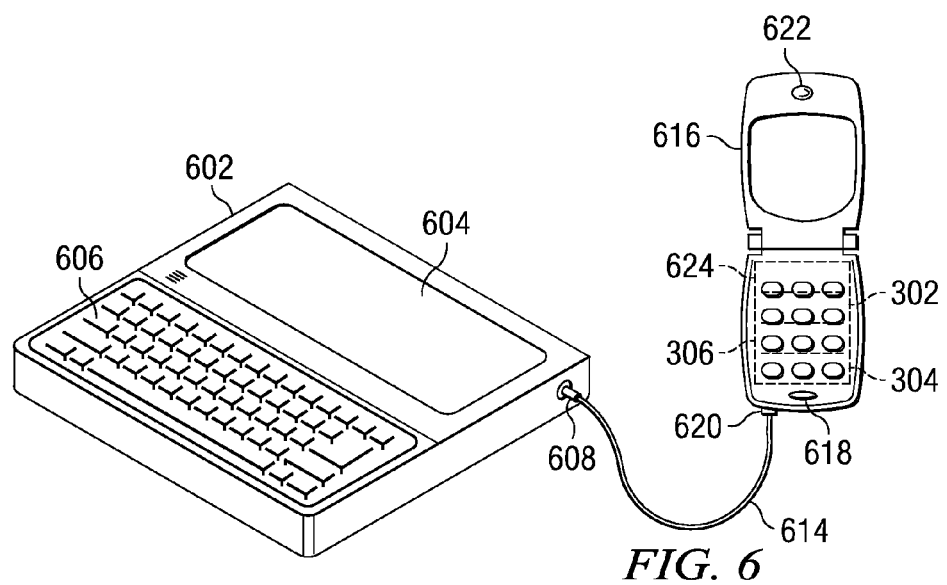
FIG. 6 show an illustrative text telephone coupled to a wireless telecommunications device configured to allow transitions from TTY operation to voice operation without user intervention.

FIG. 6 shows an illustrative TTY compatible wireless telecommunications device 616 configured to switch from TTY operation to voice operation without user intervention coupled to a text telephone 602. In the illustration of FIG. 6, telecommunications device 616 is exemplified as a cellular telephone, and text telephone 602 is shown as a portable device suitable for convenient transport. Text telephone 602 comprises keyboard 606, for entry of text in TTY or HCO modes, and display 604 for output of text in TTY or VCO modes. Text telephone 602 is coupled to cellular telephone 616 by interconnect cable 614, which connects to text telephone interface port 608 and headset port (or other interface port) 620 on cellular telephone 616. Although physical interconnect cable 614 is illustrated, it is understood that the available interconnection means includes wireless interconnection, such as Bluetooth, infrared, or other wireless interfaces. Cellular telephone 616 comprises TTY detector 302 for detection of TTY signals, coupled to both Audio Stream Manager 306 for control of audio and text signal processing, and Audio Profile Manager 304 for control of audio signal routing to audio peripherals and audio peripheral operational parameters, such as audio volume. Transceiver 624 is provided for transmitting and receiving signals on a wireless telecommunications network. Cellular telephone 616 additionally comprises microphone 618 for VCO use and speaker 622 for HCO operation. Audio input or output may also be performed using an external headset, integrated speakerphone speaker, etc.

As disclosed, TTY detector 302 identifies TTY signals received either via the telecommunications network or from text telephone 602. Based on the presence or absence of a TTY signal, Audio Stream Manager 306 and Audio Profile Manager 304 control audio processing, and audio device entities to simplify VCO or HCO operation. In the system of FIG. 6, cellular telephone 616 supplies the audio functionality required for VCO or HCO operation, and text telephone 602 supplies text entry and display. No user action is required to switch between TTY, VCO, and HCO operation.

In an alternative embodiment of the system of FIG. 6, text telephone 602 includes a TTY detector, Audio Stream Manager, and Audio Profile Manger. Audio transducers (speaker and microphone) included in text telephone 602, or an external headset (not shown) coupled to text telephone 602, perform audio input or output for VCO or HCO operation. Text telephone 602 is self-configured for TTY, VCO, or HCO operation based on the detection of TTY signals. In this alternative embodiment, microphone 618 and speaker 622 of cellular telephone 616 need not be used for VCO or HCO operation. Text telephone 602 provides the user with audio and TTY functionality, including automated switching between audio and TTY as disclosed herein, while cellular telephone 616 provides network access.

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A method for configuring a telecommunications device comprising:
   detecting text telephone signals received via a telecommunications network to be processed by an input channel of a telecommunications device; and
   switching, without user interaction, the input channel of said telecommunications device from voice operation to text operation based on the detecting, and wherein the switching comprises configuring the audio systems of the input channel of said telecommunications device for text telephone signal processing.

2. The method of claim 1, further comprising switching, without user interaction, the input channel of said telecommunications device from text operation to voice operation based on detecting no text telephone signals received via the telecommunications network.

3. The method of claim 2, further comprising routing voice signals to a selected audio peripheral based on the switching to voice operation.

4. The method of claim 2, wherein switching from text operation to voice operation further comprises setting a loudness of sound output while processing voice signals to a preselected level suitable for voice operation.

5. The method of claim 4, wherein switching from text operation to voice operation further comprises setting the loudness of sound to substantially the same loudness applied when the selected audio peripheral was last used for voice operation.

6. The method of claim 1, wherein configuring the audio subsystems comprises disabling voice signal processing in the input channel while processing the detected text telephone signals.

7. The method of claim 1, wherein configuring the audio subsystems comprises muting voice output while processing the detected text telephone signals.

8. The method of claim 1, further comprising:
   detecting text telephone signals to be processed for transmission by an output channel of the telecommunications device; and
   switching, without user interaction, the output channel of said telecommunications device from voice operation to text operation based on the detecting, and wherein the switching comprises configuring the audio systems of the output channel of said telecommunications device for text operation.

9. The method of claim 1, further comprising detecting termination of said text telephone signals.

10. The method of claim 9, further comprising enabling voice signal processing after termination of said text telephone signals.

11. A system, comprising:
    a text telephone signal detector that detects text telephone signals received via a telecommunications network for processing by an input channel of a telecommunications device; and
    coupled to said text telephone signal detector, an audio control manager adapted to switch the input channel from voice operation to text operation based on the text telephone signals being detected by said text telephone signal detector;
    wherein switching the input channel from voice to text operation comprises configuring the audio systems of the input channel of said telecommunications device for text telephone signal processing.

12. The system of claim 11, wherein said audio control manager switches the input channel of said telecommunications device from text operation to voice operation based on no text telephone signals being detected by said text telephone signal detector.

13. The system of claim 11, wherein said text telephone signal detector detects text telephone signals to be processed for transmission by an output channel of the telecommunications device; and said audio control manager switches the output channel of said telecommunications device from voice operation to text operation based on the detecting, and wherein the switching comprises configuring the audio systems of the output channel of said telecommunications device for text operation.

14. The system of claim 13, wherein said audio control manager configures said telecommunications device for voice signal processing when said text telephone signal detector detects the termination of text telephone signals.

15. The system of claim 11, wherein said audio control manager further comprises an audio stream manager coupled to said text telephone signal detector, said audio stream manager controlling selective enabling and disabling of voice signal processing in the input channel based on detection of text telephone signals received via the telecommunications network, and selective enabling and disabling of voice signal processing in an output channel based on detection of text telephone signals produced by the telecommunications device for transmission via the telecommunications network.

16. The system of claim 11, wherein said audio control manager further comprises an audio profile manager coupled to said text telephone signal detector, said audio profile manager controlling routing of an audio signal to an audio peripheral, and controlling audio peripheral sound loudness.

17. A telecommunications device comprising:
- a text telephone signal detector that detects text telephone signals received via a telecommunications network for processing by an input channel of a telecommunications device;
- coupled to said text telephone signal detector, an audio control manager configured to switch the input channel from voice operation to text operation based on the text telephone signals being detected by said text telephone signal detector; and
- a transceiver for transmitting and receiving signals on a telecommunications network;
- wherein switching the input channel from voice to text operation comprises configuring the audio systems of the input channel of said telecommunications device for text telephone signal processing.

18. The telecommunications device of claim 17, wherein said audio control manager is configured to switch the input channel from text operation to voice operation based on no text telephone signals being detected by said text telephone signal detector.

19. The telecommunications device of claim 17, wherein said text telephone signal detector is configured to detect text telephone signals to be processed for transmission by an output channel of the telecommunications device; and said audio control manager switches the output channel of said telecommunications device from voice operation to text operation based on the detecting, and wherein the switching comprises configuring the audio systems of the output channel of said telecommunications device for text operation.

20. The telecommunications device of claim 19, wherein said audio control manager is configured to switch the output channel of said telecommunications device from text operation to voice operation based on detecting no text telephone signals to be processed for transmission by the output channel, wherein the switching comprises configuring the audio systems of the output channel of said telecommunications device for voice operation.

\* \* \* \* \*